Patented Jan. 30, 1923.

1,443,813

UNITED STATES PATENT OFFICE.

ALEXANDER L. DUVAL D'ADRIAN, OF WASHINGTON, PENNSYLVANIA, ASSIGNOR TO B. F. DRAKENFELD & CO., INC., OF NEW YORK, N. Y., A CORPORATION OF NEW YORK.

ENAMEL AND METHOD OF MAKING THE SAME.

No Drawing.  Application filed July 17, 1920. Serial No. 396,947.

*To all whom it may concern:*

Be it known that I, ALEXANDER L. DUVAL D'ADRIAN, a citizen of the Republic of France, and a resident of Washington, county of Washington, and State of Pennsylvania, have invented certain new and useful Improvements in Enamels and Methods of Making the Same, of which the following is a specification.

This invention relates to enamels, and more particularly to vitreous enamels, which are used for enamel-wear for cooking vessels, sanitary devices and fixtures, and similar uses, among which might be mentioned metallic articles covered with enamel, such as bathtubs, signs, etc.

Heretofore, in the manufacture and use of vitreous enamels, some difficulty has been found in obtaining enamels of the colored kind satisfactory in regard to their color effect, and in regard to their appearance, breakage, and the like, as many of the enamels would readily craze, break or crack, and also presented a poor appearance in regard to the color, surface and gloss. In regard to the higher grade enamels, which utilize the more expensive metallic oxides, such as tin oxide, the cost of making the enamels is greater, due to the constituent tin oxide, which is expensive. In the production of these higher grade enamels, or white enamels, the same difficulties as heretofore referred to, have also been found to exist.

By my invention of an improved enamel, and the method of making the same, I overcome these difficulties, in that, in the frit used in the making of enamels, I add a certain quantity of lepidolite, which is a mineral largely found in California and other parts of the country, and analyzes approximately as follows: lithia 5%, potassa 16%, alumina 27%, silica 48% and fluorin 1%, the balance consisting principally of mechanically combined water and manganese free of iron. This lepidolite being a mineral, is held in chemical combination, and, when added to the frit, has certain distinct advantages. In the use of the frit, as heretofore used, and as is well known, certain constituents in definite proportions are utilized, these constituents and proportions being different in various processes, but all more or less well known to the art. I refer to the word "frit" in this sense as being well known to the art as consisting of the fused constituents which have been thoroughly mixed, and having the constituents thereof in suitable proportions.

My invention consists in providing a frit which contains lepidolite and has other constituents thereof rearranged in proportion, depending upon the enamel desired. I have found that, in forming a frit having this natural mineral as one of the constituents, a very desirable frit is obtained, which results in better products, as hereinafter to be described. After the frit is formed, it is cooled, as is well known, and then ground. In certain cases I can use the frit, as before described, and then add to the ground frit water and such constituents as are desired. For instance, in the better grade of enamels, I add tin oxide or an antimony compound or soda or phosphates, also sometimes magnesia sulphite and boric acid. Some of these electrolytes help to keep the particles in colloidal suspension and thicken the enamel before applied to the articles. After the frit has been ground with cold water and the added constituents, the resulting mass is applied to the metal after it has been cleaned, the mass being applied either by dipping, or spraying, or being painted with the mixture. It is then dried and baked.

What I have said applies, as is well known to the art, both to the ground coat or base coat, as also to the exterior enamel. Where a ground coat and an exterior enamel is used, a second baking is applied to fuse on the exterior enamel.

I have referred to the addition of lepidolite to the initial frit, but I have found that very good results in certain cases are also obtained by the addition of lepidolite to the ground mass, so that my invention covers not alone the addition of lepidolite to the frit itself, but also the addition of lepidolite to the ground mass. In certain other cases I have found that I can take the usual frit as heretofore known and add the lepidolite only to the ground mass. The use of the lepidolite, either in the frit or in the ground mass, or in both, results in a cheaper product of higher grade, and in a stronger enamel which is more serviceable and which does not crack or craze. Also, the use of lepidolite saves the expensive oxide of tin which heretofore has been used to the extent of about 14%. At the same time, the opacifying qualities are greatly improved. In case of blue enamels, not alone is the strength increased and the crazing decreased, but there is a much better blue produced, so that the color is highly improved. The natural mineral lepidolite thus added in the formation of the enamel acts as an opacifier, and has the property of strengthening the vitreous body resulting.

I have found that very advantageous results are obtained by utilizing the following proportions: With a frit having contents of 290 pounds, 30 pounds thereof consist of added lepidolite, so that the percentage of the lepidolite to the entire enamel batch is from 5% to 20%. Of course, different proportions of the lepidolite are added in some enamels, perhaps 50%, depending upon the product desired to be obtained, and such proportions may be regularly regulated by those skilled in the art to whom the instructions as contained in this disclosure are conveyed.

I have also found the use of lepodolite advantageous in that it assists in bringing about a fusing of the frit with lower temperatures, and hence maintains the opacity, giving at the same time a higher viscosity, so that the enamel does not run so readily.

It will, therefore, be seen that the use of my invention, which provides an improved enamel, as also a new method of making the same, has the advantage of producing a better appearance in the end product, being more vivid and more like glass, resisting liability to scratching to a large extent, or to a high degree. At the same time the tensile strength is increased, the enamel when applid to the metal surfaces has better holding qualities and will not readily crack or craze. In the high grade enamels, principally white, the proportion of the expensive chemicals, such as tin oxide, antimony oxide, antimony salts, and cryolite (compounds) is reduced or eliminated. These advantages are largely due to the constituents composing lepidolite, and due to the fact that these constituents already exist in chemical combination. Among the advantages just referred to, of course, the other features heretofore pointed out are also important.

I have described one form of my improved enamel, and one method of making the same, to act as illustrations or embodiments of my invention, but it is clear that changes may be made therein, without departing from the scope of my invention as claimed.

I claim as new and desire to secure by Letters Patent:

1. The method of making an enamel batch, which consists in adding lepidolite to an enamel frit and fusing the lepidolite therewith to produce an enamel.

2. The method of making an improved enamel which consists in adding from 8% to 20% of lepidolite to an enamel frit, and then fusing the same.

3. The method of making an improved enamel which consists in grinding an enamel frit, adding lepidolite to the ground mass, and fusing the mass to the article to be enameled.

4. An enamel batch adapted to produce an enamel having a minimum tendency to craze and a relatively great brilliancy and strength comprising separately fused frit and lepidolite.

In testimony that I claim the foregoing as my invention, I have signed my name hereunder.

ALEXANDER L. DUVAL d'ADRIAN.